A. PETERS.
DOUGH CUTTING AND MOLDING MACHINE.
APPLICATION FILED JUNE 26, 1917.

1,337,152.

Patented Apr. 13, 1920.
3 SHEETS—SHEET 1.

Inventor
ANDREW PETERS

By Harry C. Schroeder
Attorney

A. PETERS.
DOUGH CUTTING AND MOLDING MACHINE.
APPLICATION FILED JUNE 26, 1917.

1,337,152. Patented Apr. 13, 1920.
3 SHEETS—SHEET 2.

Inventor
ANDREW PETERS
By Harry C. Schroeder
Attorney

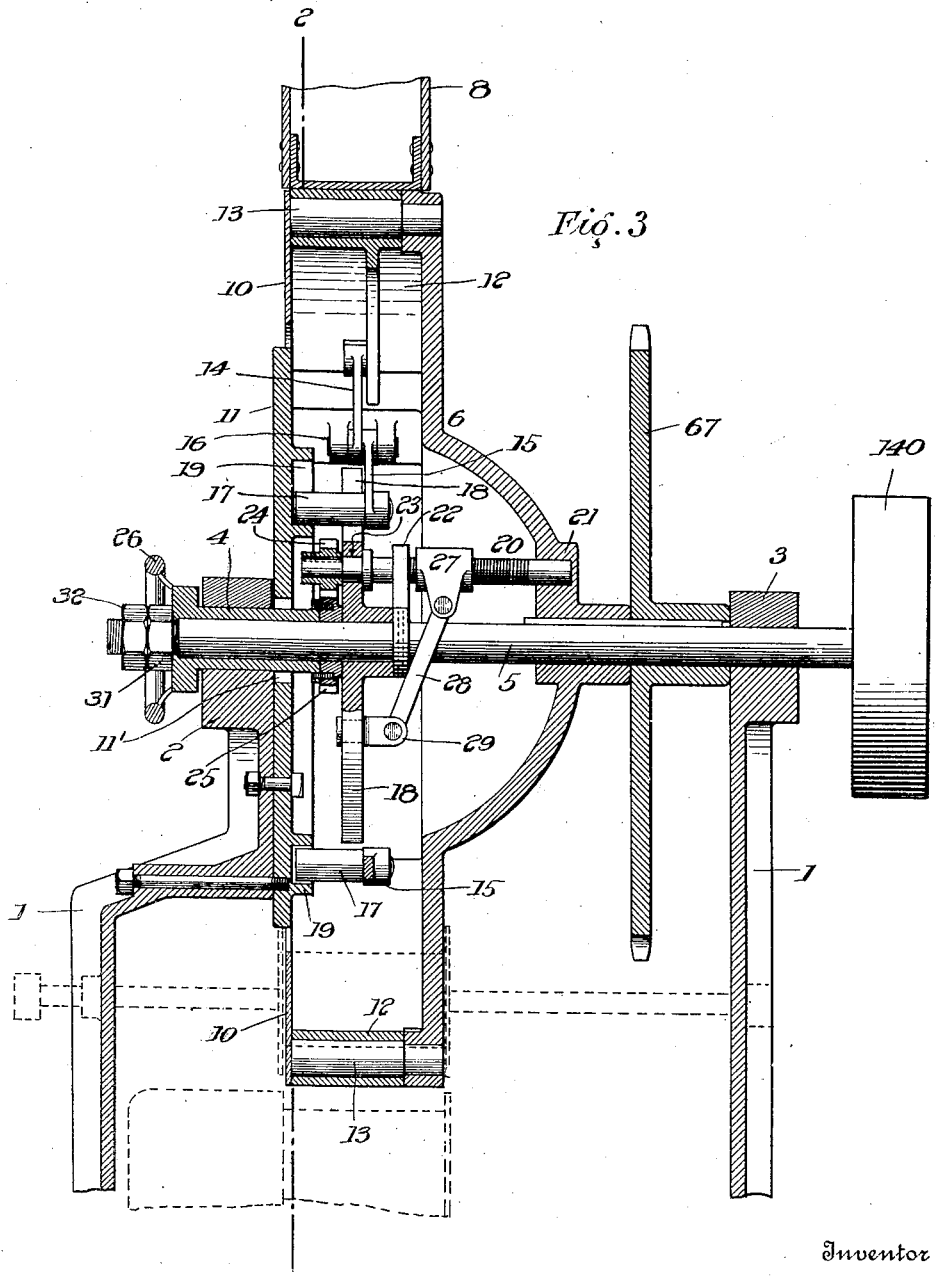

UNITED STATES PATENT OFFICE.

ANDREW PETERS, OF OAKLAND, CALIFORNIA.

DOUGH CUTTING AND MOLDING MACHINE.

1,337,152.      Specification of Letters Patent.      Patented Apr. 13, 1920.

Application filed June 26, 1917. Serial No. 176,989.

*To all whom it may concern:*

Be it known that I, ANDREW PETERS, citizen of the United States, residing at Oakland, in the county of Alameda and State of California, have invented certain new and useful Improvements in Dough Cutting and Molding Machines, of which the following is a specification.

This invention is an improved machine for cutting and molding dough and for delivering the molded dough into baking pans and removing the pans from the machine.

The machine may be built for large or small bakeries and is particularly adapted for use in small bakeries.

In the accompanying drawings which form a part of this specification and the appended claims, I have illustrated the invention in the form which I consider the best, but it is to be understood that the invention may be embodied in other forms and it is intended that the claims cover the invention in whatever form it may be embodied.

Referring to the drawings:

Fig. 3 is a sectional view taken on line 3—3 of Fig. 2.

Figure 1:
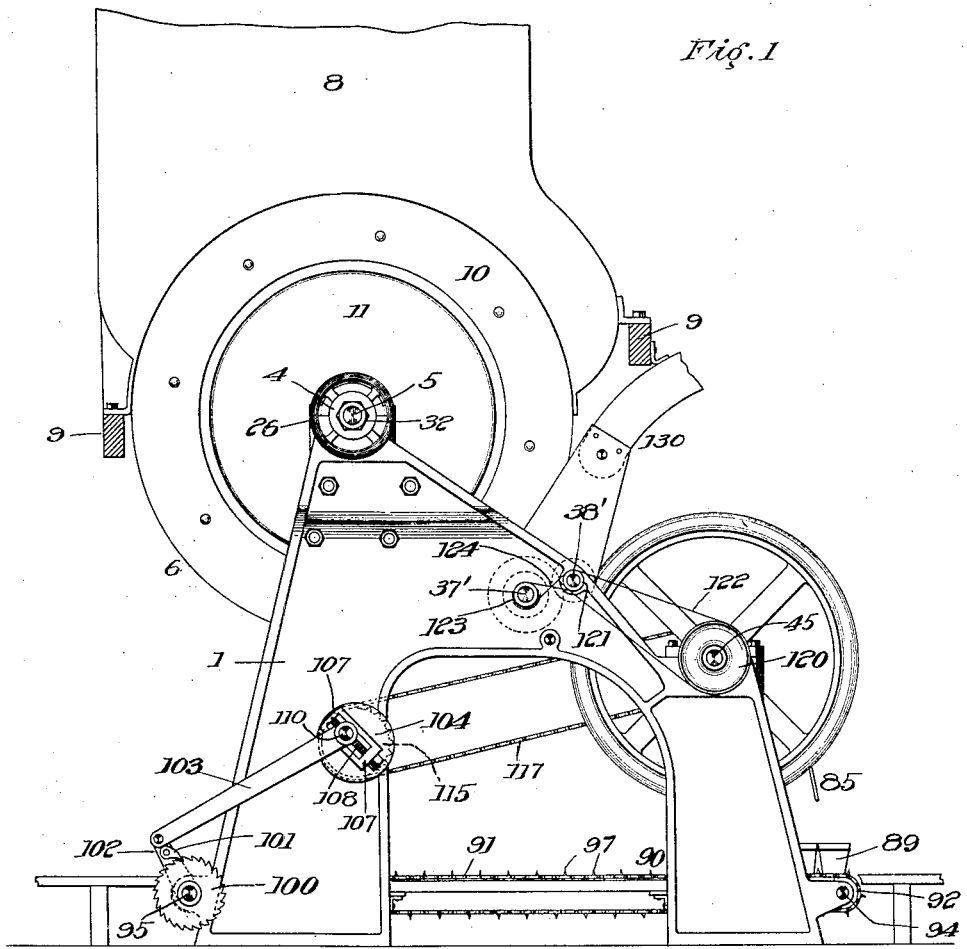
Figure 1 is a side elevation of the machine.
Figure 2:
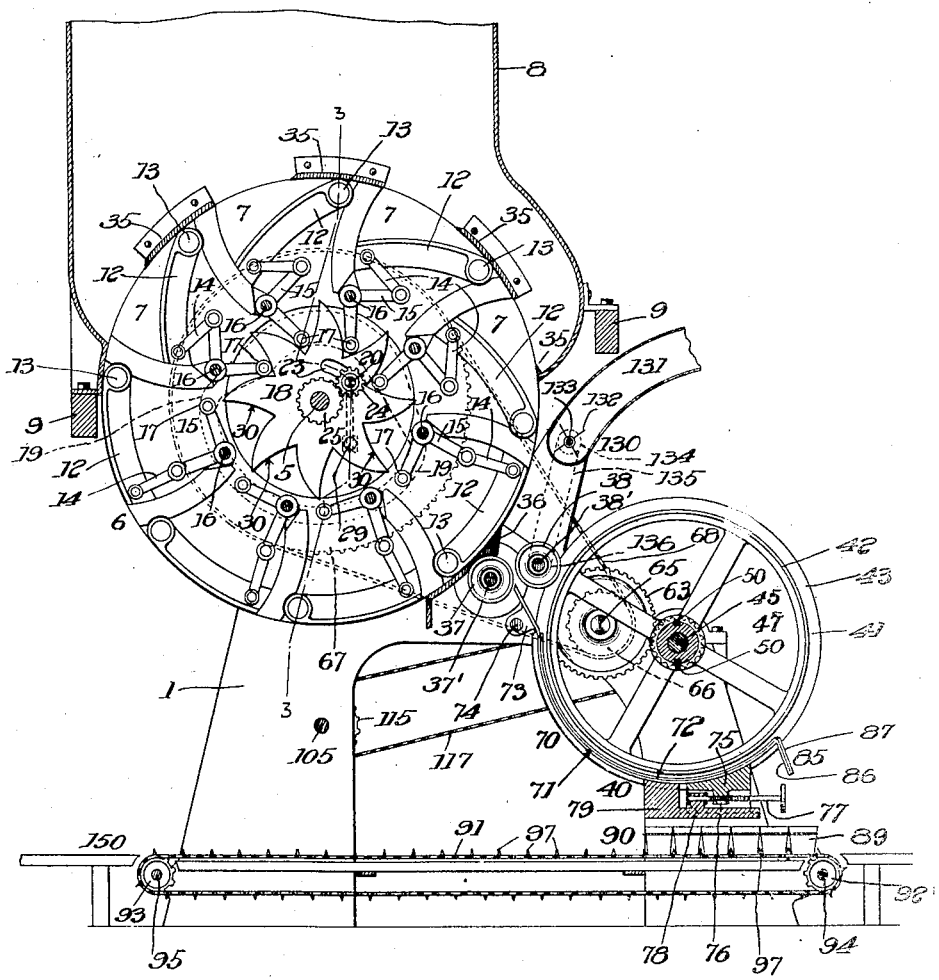
Fig. 2 is a vertical section of the machine taken on line 2—2 of Figs. 3 and 4.

In the drawings 1 indicates a frame for the machine on which are bearings 2 and 3. In the bearing 2 is journaled a sleeve 4 and one end of receiver shaft 5, the other end of which shaft is journaled in bearing 3. On the shaft 5 is keyed a circular rotary dough receiver 6 formed with a plurality of dough pockets 7 in its periphery. A dough hopper 8 is mounted above the dough receiver 6 on frame 9. The outer portion of the front of said receiver is closed by an annular ring shaped wall 10, which is secured to and rotates with the receiver. A stationary wall 11 closes the front of the receiver within the annular wall 10, which wall is bolted to the frame 1, and is provided with an opening 11' through which extends the sleeve 4. Pistons 12, pivoted at 13 in the receiver 6, at the periphery thereof, form the bottoms of the dough pockets 7. Links 14 connect the pistons 12 to one end of bell crank levers 15 which are pivoted to the receiver at 16, on the other end of which levers are rollers 17 adapted to engage a star wheel 18 mounted on receiver shaft 5 and a cam 19 on the stationary wall 11. The engagement of the rollers 17 with projections of star wheel 18 limits the inward movement of the pistons 12, and the engagement of said rollers with cam 19 causes the pistons to be moved outwardly and inwardly.

A screw shaft 20 is journaled at its rear end in bearing 21 in the receiver and in bearing 22 on the receiver shaft 5, the forward end of which screw shaft projects through a slot 23 in the star wheel 18 allowing the star wheel to turn slightly on the shaft 5. On the forward end of the screw shaft 20 is secured a pinion 24 which meshes with a gear 25 secured on the rear end of sleeve 4. The forward end of the sleeve 4 has a hand wheel 26 by means of which the sleeve and gear 25 are turned to rotate screw shaft 20 through pinion 24. A nut 27 screws on screw shaft 20 which nut is connected to the star wheel 18 by link 28 and connection 29. The link 28 holds the nut 27 against rotation so that as the screw shaft 20 is rotated the nut is moved axially on the screw shaft and the star wheel 18 turned on the shaft 5 whereby the surfaces 30 of the star wheel are so adjusted as to adjust the limit of the inward movement of the bell cranks 15 and pistons 12. A nut 31 screws on the forward end of shaft 5, against the forward part of sleeve 4, and locks said sleeve against rotation relative to the shaft 5 and the star wheel 18 in adjusted position. A lock nut 32 screws onto the end of the shaft against the nut 31, and locks said nut in engagement with the end of said sleeve.

Knives 35 are secured to and within the hopper 8 which knives rest adjacent the periphery of the receiver 6, and are adapted to cut the dough in the pockets 7, from the mass of dough in the hopper as the receiver is rotated. A knife 36 is secured to the frame 1 adjacent the lower part of the periphery of the receiver 6, which knife is adapted to cut the dough from the surface of the pistons 12 when the pistons have been moved outward by the engagement of roller 17 and cam 19 and the dough ejected from the pockets 7 by said pistons. A roller 37 is mounted on shaft 37', journaled in frame 1 below the knife 36, and a roller 38 is mounted on a shaft 38', journaled in said frame adjacent roller 37, between which rollers the dough falls from the pistons 12 when moved outward and the dough is cut therefrom by knife 36, and is passed to a molding machine 40 which will not be described in detail. From the molding machine the molded dough is delivered into the baking pans 89, which are carried by a conveyer 90 to a suitable delivery point 150.

A pulley 140 is secured to the rear end of receiver shaft 5, to which power may be applied to drive the machine.

The dough is placed in the hopper 8, which enters pockets 7 and as the receiver 6 is rotated, the knives 35 cut the dough in the pockets from the mass of dough in the hopper. The knives 35 are spaced at suitable distances apart and as the pockets pass from under one knife to another more dough is pressed into the pockets which is cut by the succeeding knives, thus cutting the dough in the pockets several times so that the gas in the dough may escape therefrom through the cuts therein and out between the dough and the walls of the hopper. As the pistons approach the rollers 37 and 38, the rollers 17 are engaged by the cam 19, and the bell cranks 15 are swung on their pivots and the pistons 12, through links 14, are forced outwardly, thus forcing the dough out of the pockets between the rollers 37 and 38, during which operation the knife 36 cuts the dough off the face of the pistons. The dough after passing between the rollers 37 and 38, enters the mold and is molded into the form of a bread loaf, and then the molded dough drops off into the baking pans 89 on the conveyer 90, the conveyer being driven intermittently so that a pan is brought into position to receive each piece of molded dough as it drops from the mold. The conveyer conveys the pans and the molded dough therein from under the mold to a table 150, from whence they are taken in due course and put into an oven and the loaves baked.

Having described my invention, I claim as new and desire to secure by Letters Patent:

1. A dough cutting machine comprising a rotary receiver provided with peripheral pockets, a hopper for supplying dough to said pockets, spaced apart knives in said hopper for cutting the dough in the pockets from the dough in the hopper, and means for ejecting the dough from the pockets.

2. A dough cutting machine comprising a rotary receiver provided with dough-receiving pockets, pistons forming the bottoms of said pockets, bell-crank levers connected with the pistons, a star wheel positioned to engage said bell-crank levers, whereby the inward positions of the pistons are determined, means for adjusting the star wheel, and means for engaging the bell-crank levers to actuate the pistons, whereby the dough is ejected from the pockets.

3. A dough cutting machine comprising a rotary receiver provided with peripheral pockets, pistons forming the bottoms of said pockets, bell crank levers connected with said pistons, and means engaging said bell-crank levers to actuate the pistons, whereby the pockets are opened and closed.

4. A dough cutting machine comprising a rotary receiver provided with peripheral pockets, pistons forming the bottoms of said pockets, bell-crank levers connected with said pistons, and means engaging said bell-crank levers for varying the positions of the pistons, whereby the sizes of the pockets are varied.

5. A dough cutting machine comprising a carrier provided with pockets positioned to receive the dough from a large mass, a star wheel, means coöperating with the star wheel to limit the sizes of the pockets, means for varying the position of the star wheel, means for severing the dough in the pockets from said mass, and means for ejecting the dough from the pockets.

In testimony whereof I affix my signature.

ANDREW PETERS.